United States Patent
Do et al.

(10) Patent No.: US 7,976,964 B2
(45) Date of Patent: Jul. 12, 2011

(54) DISK DRIVE WITH LAMINATED MAGNETIC THIN FILMS WITH SUBLAYERS FOR MAGNETIC RECORDING

(75) Inventors: Hoa Van Do, Fremont, CA (US); Eric Edward Fullerton, Morgan Hill, CA (US); David Thomas Margulies, Los Gatos, CA (US); Natacha Frederique Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1694 days.

(21) Appl. No.: 11/084,402

(22) Filed: Mar. 18, 2005

(65) Prior Publication Data

US 2006/0210835 A1    Sep. 21, 2006

(51) Int. Cl.
*G11B 5/66* (2006.01)
(52) U.S. Cl. ....................................................... 428/828
(58) Field of Classification Search .................. None
See application file for complete search history.

(56) References Cited

U.S. PATENT DOCUMENTS

| | | | |
|---|---|---|---|
| 6,280,813 B1 | 8/2001 | Carey et al. | |
| 6,567,236 B1 * | 5/2003 | Doerner et al. | 360/97.01 |
| 6,602,612 B2 | 8/2003 | Abarra et al. | |
| 6,623,875 B2 | 9/2003 | Inomata et al. | |
| 6,645,614 B1 | 11/2003 | Girt et al. | |
| 6,645,646 B1 | 11/2003 | Umeda et al. | |
| 6,689,497 B1 | 2/2004 | Girt | |
| 6,737,172 B1 | 5/2004 | Girt | |
| 6,761,982 B2 | 7/2004 | Sakawaki et al. | |
| 6,773,833 B2 | 8/2004 | Inomata et al. | |
| 6,773,834 B2 | 8/2004 | Do et al. | |
| 6,777,112 B1 | 8/2004 | Girt et al. | |
| 6,899,959 B2 * | 5/2005 | Bertero et al. | 428/611 |
| 2002/0098390 A1 | 7/2002 | Do et al. | |
| 2003/0059648 A1 | 3/2003 | Akimoto et al. | |
| 2003/0087135 A1 | 5/2003 | Wang et al. | |

(Continued)

FOREIGN PATENT DOCUMENTS

JP    2003151116 A1    5/2003

(Continued)

OTHER PUBLICATIONS

S. Pang, et al., "Advanced Laminated Antiferromagnetically Coupled Media with High Thermal Stability and Low Noise", IEEE Trans. Magnetics, vol. 38, No. 5, Sep. 2002, p. 1940.

(Continued)

*Primary Examiner* — Holly Rickman
(74) *Attorney, Agent, or Firm* — G. Marlin Knight

(57) ABSTRACT

The invention includes a disk drive with a magnetic recording disk with an upper and lower sublayer in at least one magnetic layer of a laminated magnetic layer structure that includes a spacer layer that substantially decouples the magnetic layers. The lower sublayer has a lower boron content than the upper sublayer and a preferred embodiment is CoPtCrBTa. The upper sublayer is deposited onto the lower sublayer and is preferably CoPtCrB with a higher boron content than the lower sublayer. The composition of the lower sublayer gives it a very low moment with low intrinsic coercivity which would not be useful as a recording layer on its own. The upper sublayer is a higher moment alloy with high intrinsic coercivity. An embodiment of the invention includes a laminated magnetic layer structure which is antiferromagnetically coupled to a lower ferromagnetic layer.

7 Claims, 5 Drawing Sheets

U.S. PATENT DOCUMENTS

| | | |
|---|---|---|
| 2003/0152805 A1 | 8/2003 | Bertero et al. |
| 2003/0170499 A1 | 9/2003 | Okamoto |
| 2006/0051620 A1* | 3/2006 | Hinoue et al. ............. 428/828.1 |
| 2006/0183003 A1* | 8/2006 | Minardi et al. ............... 428/828 |
| 2006/0210834 A1* | 9/2006 | Do et al. .................... 428/828.1 |
| 2006/0292401 A1* | 12/2006 | Suzuki et al. ............. 428/828.1 |
| 2007/0019328 A1* | 1/2007 | Mirzamaani et al. ......... 360/135 |
| 2007/0037015 A1* | 2/2007 | Mirzamaani et al. ......... 428/828 |

FOREIGN PATENT DOCUMENTS

| | | |
|---|---|---|
| JP | 2003303408 A1 | 10/2003 |

OTHER PUBLICATIONS

N. Abarra, et al., "Synthetic Ferrimagnetic Media", Fujitsu Scientific Tech. J., 37,2.p. 145-154, Dec. 2001.

* cited by examiner

DISK DRIVE WITH LAMINATED MAGNETIC THIN FILMS WITH SUBLAYERS FOR MAGNETIC RECORDING

RELATED APPLICATIONS

Co-pending, commonly assigned application bearing Ser. No. 11/084,401 filed on Mar. 18, 2005 describes an upper and lower sublayer in at least one magnetic layer of a laminated magnetic layer structure that includes a spacer layer that substantially decouples the magnetic layers. The lower sublayer has a lower boron content than the upper sublayer and a preferred embodiment is CoPtCrBTa. The upper sublayer is deposited onto the lower sublayer and is preferably CoPtCrB with a higher boron content than the lower sublayer. The upper sublayer is a higher moment alloy with high intrinsic coercivity. The sublayers are strongly coupled together because they are in direct contact and magnetically act as one layer with the effective intrinsic coercivity being the average of the two sublayers.

Co-pending, commonly assigned application bearing Ser. No. 10/628,011 filed on Jun. 11, 2003 (issued as U.S. Pat. No. 6,939,626 to Tang on Sep. 6, 2005) describes a laminated antiferromagnetically coupled magnetic recording medium with three magnetic layers separated by two nonmagnetic spacer layers with the middle and bottom layers being antiferromagnetically coupled, and the upper magnetic layer having a higher magnetic anisotropy than the middle magnetic layer. The magnetic anisotropy can be adjusted by primarily by changing the platinum content versus the cobalt content of a cobalt based magnetic alloy such as CoPtCr or CoPtCrB. The magnetization can be adjusted by altering the chromium and/or the boron content versus the cobalt content. Lowering the chromium content and increasing the cobalt content increases the magnetization.

Co-pending, commonly assigned application bearing Ser. No. 10/931,642 filed on Aug. 8, 2004 describes a laminated antiferromagnetically coupled magnetic recording medium with an AFC master layer comprising at least two magnetic layers with the top magnetic layer including copper. The slave layer is separated from the master layer structure by a nonmagnetic spacer layer, typically Ru, selected to antiferromagnetically couple the layers. The master layer structure includes a bottom and top layer of distinct ferromagnetic materials. Preferably, the top layer of the master layer is a cobalt alloy including from 1 to 5 at. % copper with an example being $CoPt_{13}Cr_{20}B_8Cu_2$. In one embodiment the middle layer is $CoPt_{13}Cr_{19}B_7$, the slave layer is $CoCr_{10}$ and the spacer layer is ruthenium (Ru).

FIELD OF THE INVENTION

The invention relates to magnetic thin film media with antiferromagnetically coupled ferromagnetic layers and more particularly to materials used for the plurality of thin films in such media.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 includes substrate 26 of glass or AlMg with an electroless coating of NiP that has been highly polished. The thin films 21 on the disk 16 typically include a chromium or chromium alloy underlayer and at least one ferromagnetic layer based on various alloys of cobalt, platinum and chromium. Additional elements such as tantalum and boron are often used in the magnetic alloy. A protective overcoat layer is used to improve wearability and corrosion resistance. Various seed layers, multiple underlayers and multilayered magnetic films have all been described in the prior art. Laminated magnetic films include multiple ferromagnetic layers that are substantially decoupled. Seed layers are used with nonmetallic substrate materials such as glass. Typically the seed layer is a relatively thin crystalline film which is the first layer deposited on the substrate. Materials proposed for use as seed layers include chromium, titanium, tantalum, MgO, tungsten, CrTi, FeAl, NiAl and RuAl. The use of pre-seed layers 31 is relatively recent practice. The pre-seed layer is a non-crystalline thin film which provides a base for growing the subsequent crystalline films that is superior to the substrate for this purpose.

It is known that substantially improved S0NR can be achieved by the use of a laminated magnetic structure of two (or more) separate magnetic layers that are separated by a nonmagnetic spacer layer. The reduced media noise is believed due to reduced exchange coupling between the magnetic layers. The use of lamination for noise reduction has been extensively studied to find the favorable spacer layer materials, including Cr, CrV, Mo and Ru, and spacer thicknesses, from a few angstroms upward, that result in the best decoupling of the magnetic layers and the lowest media noise.

As the storage density of magnetic recording disks has increased, the product of the remanent magnetization $M_r$ (the magnetic moment per unit volume of ferromagnetic material) and the magnetic layer thickness t has decreased. Similarly, the coercive field or coercivity ($H_c$) of the magnetic layer has increased. This has led to a decrease in the ratio $M_r t/H_c$. To achieve the reduction in $M_r t$, the thickness of the magnetic layer can be reduced, but only to a limit because the layer will exhibit increasing magnetic decay, which has been attributed to thermal activation of small magnetic grains, i.e. the superparamagnetic effect. The thermal stability of a magnetic grain is to a large extent determined by $K_u V$, where $K_u$ is the magnetic anisotropy constant of the layer and V is the volume of the magnetic grain. As the layer thickness is decreased, V decreases. At some point, as V decreases, the stored magnetic information will no longer be stable under the storage device's operating conditions.

One approach to the solution of this problem is to use a higher anisotropy material, i.e. one with a higher $K_u$. However, the increase in $K_u$ is limited by the point where the coercivity $H_c$, which is approximately equal to $K_u/M_r$, becomes too great to be written by a practical write heads. A similar approach is to reduce the $M_r$ of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (S0NR) of the magnetic layer.

In U.S. Pat. No. 6,280,813 to Carey, et al. a layer structure is described that includes at least two ferromagnetic films antiferromagnetically coupled together across a nonferromagnetic coupling/spacer film. Antiferromagnetic coupling (AFC) maintains stability of the media with reductions in $M_r t$. In general, the exchange coupling oscillates from ferromagnetic to antiferromagnetic with increasing coupling/spacer film thickness and that the preferred 6 Angstrom thickness of the ruthenium coupling/spacer layer was selected because it corresponds to the first antiferromagnetic peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product ($M_r t$) of the recording layer is the difference in the $M_r t$ values of the two ferromagnetic films. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater $M_r t$ than the bottom ferromagnetic layer, so that the net moment in zero applied magnetic field is low, but nonzero. The Carey '813 patent also states that the antiferromagnetic coupling is enhanced by a thin (5 Angstroms) ferromagnetic cobalt interface layer added between the coupling/spacer layer and the top and/or bottom ferromagnetic layers. The patent mentions, but does not elaborate on the use CoCr interface layers.

In U.S. Pat. No. 6,567,236 to Doerner, et al. (May 20, 2003) an antiferromagnetically coupled layer structure is described for magnetic recording wherein the top ferromagnetic structure is a bilayer structure including a relatively thin first sublayer of ferromagnetic material in contact with the coupling/spacer layer. The first sublayer has a higher magnetic moment than the second sublayer. The second sublayer has a lower magnetic moment and is much thicker than the first sublayer with a composition and thickness selected to provide the $M_r t$ when combined with first sublayer that is needed for the overall magnetic structure. A preferred embodiment of a layer structure according to the patent is a pre-seed layer of CrTi; a seed layer of RuAl; an underlayer of CrTi; a bottom ferromagnetic layer of CoCr; an AFC coupling/spacer layer of Ru; and a top ferromagnetic structure including: a thin first sublayer of CoCr, CoCrB or CoPtCrB, and a thicker second sublayer of material of CoPtCrB with a lower moment than the first sublayer.

Published US patent application 2002/0098390 by H. V. Do, et al., describes a laminated medium for horizontal magnetic recording that includes an antiferromagnetically coupled (AFC) magnetic layer structure and a conventional single magnetic layer. The AFC magnetic layer structure has a net remanent magnetization-thickness product ($M_r t$) which is the difference in the MA values of its two ferromagnetic films. The type of ferromagnetic material and the thickness values of the ferromagnetic films are chosen so that the net moment in zero applied field will be low, but nonzero. The MA for the media is given by the sum of the MA of the upper magnetic layer and the MA of the AF-coupled layer stack. This allows control of the $M_r t$ independently from either $M_r$ or t. Alternatively, the magnetization (the magnetic moment per unit volume of material) of the two ferromagnetic films may be made different by using different ferromagnetic materials for the two. In a laminated medium each of the magnetic layers contributes to the readback signal; therefore, the net magnetic moment of the AFC layer stack must be non-zero. The nonferromagnetic spacer layer between the AFC layer and the single ferromagnetic layer has a composition and thickness to prevent substantial antiferromagnetic exchange coupling. The laminated medium has improved thermal stability from the antiferromagnetic coupling and reduced intrinsic media noise from the lamination.

What is needed is way to improve the S0NR in laminated media and allow increased areal density.

SUMMARY OF THE INVENTION

The invention includes a disk drive with a magnetic recording disk that includes an upper and lower sublayer in at least one magnetic layer of a laminated magnetic layer structure that includes a spacer layer that substantially decouples the magnetic layers. The lower sublayer has a lower boron content than the upper sublayer and a preferred embodiment is CoPtCrBTa. The upper sublayer is deposited onto the lower sublayer and is preferably CoPtCrB with a higher boron content than the lower sublayer. The lower boron content of the lower sublayer is believed to contribute to S0NR improvement by improved epitaxial growth established by the lower sublayer. The preferred compositional ranges for the lower sublayer are:

10-14 at. % Pt,
19-26 at. % Cr,
0-7 at. % boron (B),
0-3 at. % Ta
remainder Co.

If the lower sublayer contains boron and Ta, then boron+Ta should be less than or equal to 7 atomic %. The composition of the lower sublayer gives it a very low moment with low intrinsic coercivity which would not be useful as a recording layer on its own. The preferred compositional ranges for the upper sublayer are:

11-14 at. % Pt,
11-20 at. % Cr,
8-16 at. % B
remainder Co.

The upper sublayer is a higher moment alloy with high intrinsic coercivity. The sublayers are strongly coupled together because they are in direct contact and magnetically act as one layer with the effective intrinsic coercivity being the average of the two sublayers. Therefore, the $H_0$ of this composite middle layer can be readily adjusted by simply changing the thickness ratio of the two layers. Furthermore, the $H_0$ can be changed more readily and with much finer control over the value than is possible by changing the alloy composition as is done in the prior art. An embodiment of the invention includes the laminated magnetic layer structure described above with an antiferromagnetically coupled lower magnetic layer.

DETAILED DESCRIPTION OF THE INVENTION AND THE PREFERRED EMBODIMENTS

Figure 1:
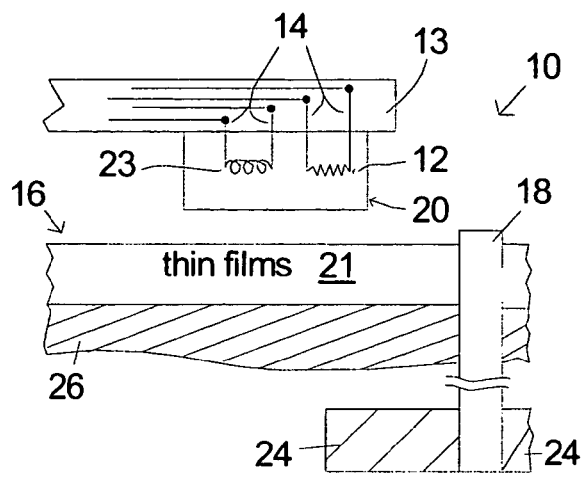
FIG. 1 is a symbolic illustration of the prior art showing the relationships between the head and associated components in a disk drive.
Figure 2:
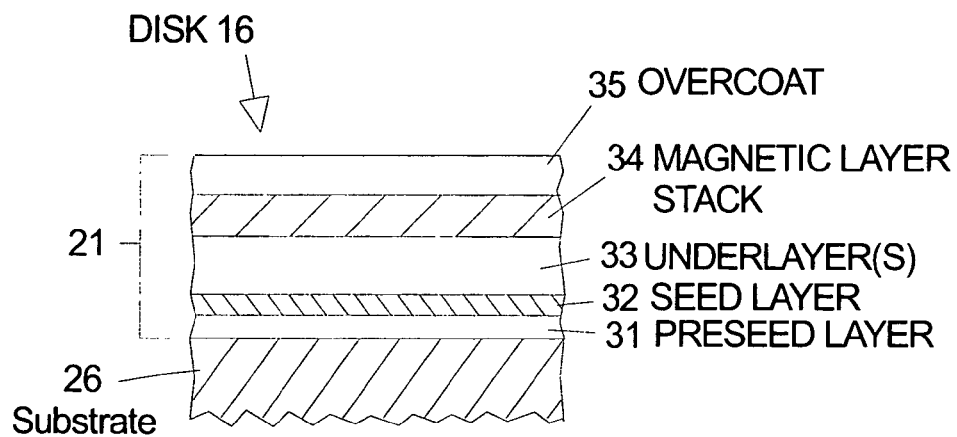
FIG. 2 is an illustration of a prior art layer structure for a magnetic thin film disk with which the magnetic layer stack of the invention can be used.

FIG. 2 illustrates a prior art layer structure 21 of a thin film magnetic disk 16 in which the layer stack according to the invention can be used. In a preferred embodiment the substrate 26 is AlMg/NiP. The underlayer 33 is preferably composed of two sublayers (not shown) with the lower sublayer being Cr and the upper sublayer being Cr80Mo15B5. The layers under the underlayer 33 may be any of several combinations of seed layers 32 and pre-seed layers 31 as noted in more detail below. The layer structure shown in FIG. 2 can be used with a variety of magnetic layer stacks 34. The prior art magnetic layer stack 34 is composed of a plurality of layers which are further illustrated in FIG. 3. The layer stack 34 shown is a laminated, antiferromagnetically coupled structure including an upper magnetic layer 36 (the magnetic layer nearest the surface of the disk and, therefore, the head), a spacer layer 37 and a middle magnetic layer 38. The AFC spacer 39 is typically ruthenium as is the spacer layer 37, but the spacer layer 37 is selected to substantially decouple the upper and middle magnetic layers. The lower magnetic layer 40 is lowest layer in the stack and is the first one deposited. The lower layer in this type of film stack is sometimes called an AFC-slave layer since it reacts to the field from the ferromagnetic layer directly above it. In a preferred embodiment the lower magnetic layer 40 is CoCrTa and an exemplary embodiment is Co82Cr16Ta2.

Figure 4A:
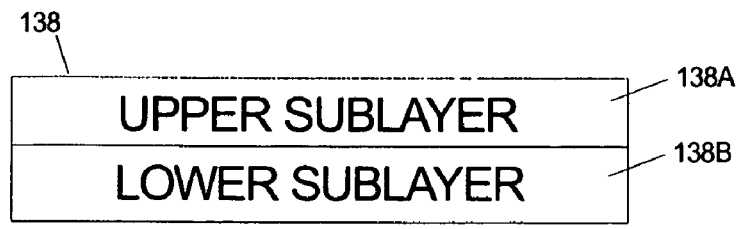
FIG. 4A is an illustration of an upper and lower sublayer of a magnetic layer according to the invention.
Figure 4B:
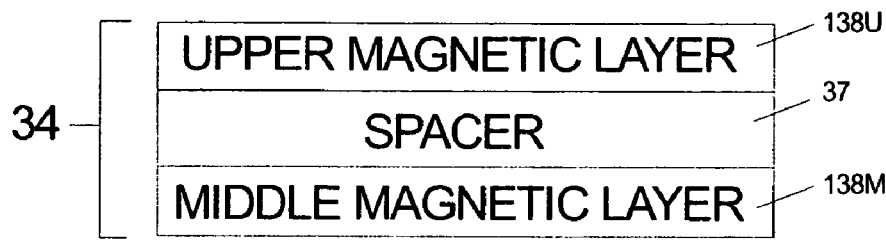
FIG. 4B is an illustration of a laminated magnetic layer structure according to the invention.

FIG. 4A illustrates an upper and lower sublayer 138A, 138B of a magnetic layer 138 according to the invention. FIG. 4B illustrates a laminated layer stack according to the invention that includes an upper magnetic layer 138U, a decoupling spacer layer 37 and a middle magnetic layer 138M. In this embodiment the AFC spacer 39 and the lower magnetic lower 40 are not present. In alternative embodiments, either or both of the magnetic layers in the laminated magnetic layer structure can have an upper and lower sublayer according to the invention.

Figure 4C:
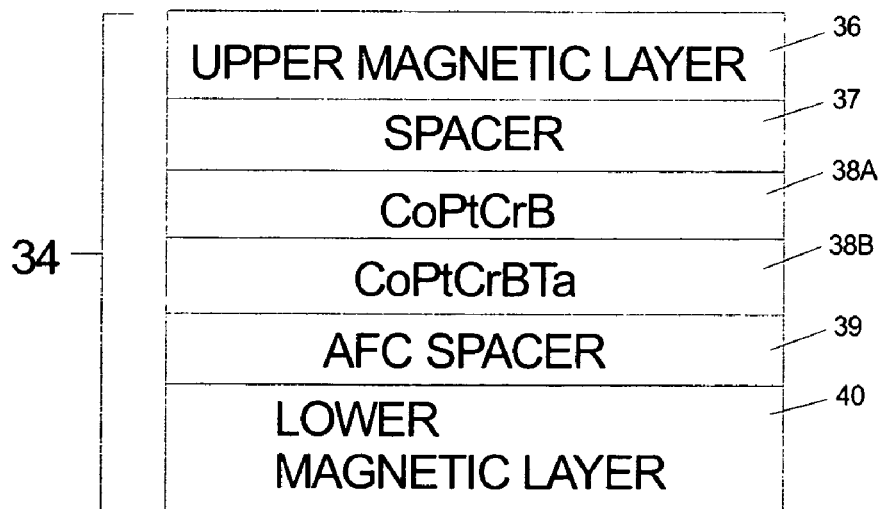
FIG. 4C is an illustration of a laminated, antiferromagnetically coupled magnetic layer stack for a magnetic thin film disk according to a first embodiment of the invention.

An antiferromagnetically coupled magnetic layer stack 34 according to the invention, illustrated in FIG. 4C, uses two layers 38A, 38B for the middle magnetic layer 38. The upper layer 38A is preferably CoPtCrB and the lower layer 38B is preferably CoPtCrBTa. The preferred compositional ranges for the lower sublayer 38B are:

10-14 at. % Pt,
19-26 at. % Cr,
0-7 at. % boron (B),
0-3 at. % Ta
remainder Co.

An exemplary embodiment of uses Co57Pt13Cr23B5Ta2 for lower layer 38B. The lower sublayer contains Ta, then boron+Ta should be less than or equal to 7 atomic %. The composition of the lower sublayer gives it a very low moment with low intrinsic coercivity which would not be useful as a recording layer on its own. The preferred compositional ranges for the upper sublayer 38A are:

11-14 at. % Pt,
11-20 at. % Cr,
8-16 at. % B
remainder Co.

An exemplary embodiment of uses Co63Pt12Cr14B11 for the upper sublayer 38A.

The upper magnetic layer 36 is preferably CoPtCrB with:
11-14 at. % Pt, 11-20 at. % Cr, 8-16 at. % B with the remainder being Co. An exemplary embodiment uses Co63Pt12Cr14B11 for the upper magnetic layer 36. In a preferred embodiment the upper magnetic layer 36 can be the same material as the upper sublayer 38A.

Figure 3:
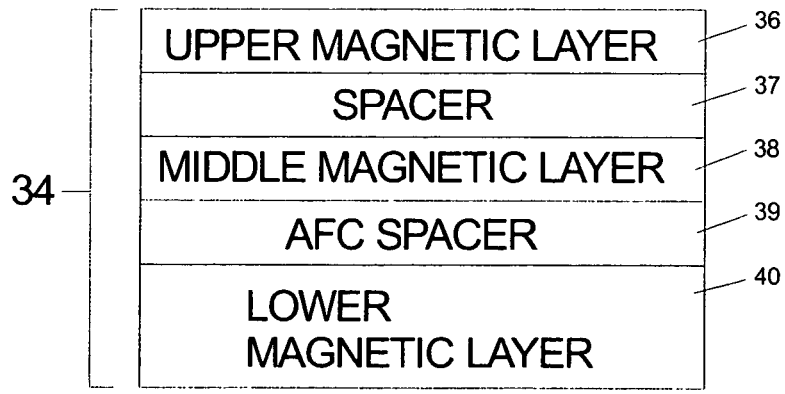
FIG. 3 is an illustration of a laminated magnetic layer stack for a magnetic thin film disk according to the prior art.

In order to increase the areal density of laminated recording media it is imperative that the signal-to-noise ratio (S0NR) of the media be increased In the prior art structure shown in FIG. 3, the middle magnetic layer 38 can be CoPtCrB containing B greater than or equal to 7 atomic % and Cr less than or equal to 20 atomic %. It is essential that this layer have the concentration of B greater than or equal to 7 atomic % in order to obtain reasonable S0NR values and the concentration of Cr less than or equal to 20 atomic % in order to obtain enough magnetization and intrinsic coercivity. The invention replaces the lower layer 38 in the laminated media structure of FIG. 3 with two CoPtCrBX layers. The lower of these two sublayers 38B is a very low moment alloy with low intrinsic coercivity and would not be used as a recording layer on its own. The upper layer 38A contains B greater than or equal to 8 atomic % and Cr less than or equal to 20 atomic % and is a higher moment alloy with high intrinsic coercivity. The sublayers are strongly coupled together because they are in direct contact with each other and act as one layer with the effective intrinsic coercivity being the average of the two layers.

The lower boron content of the lower sublayer is believed to contribute to S0NR improvement by improved epitaxial growth established by the lower sublayer. Boron is known to have the effect of producing amorphous boundaries in the magnetic grains; therefore, establishing the grain epitaxy with a lower boron content ferromagnetic sublayer according to the invention is believed to explain the favorable empirical results provided by the invention.

Figure 5:
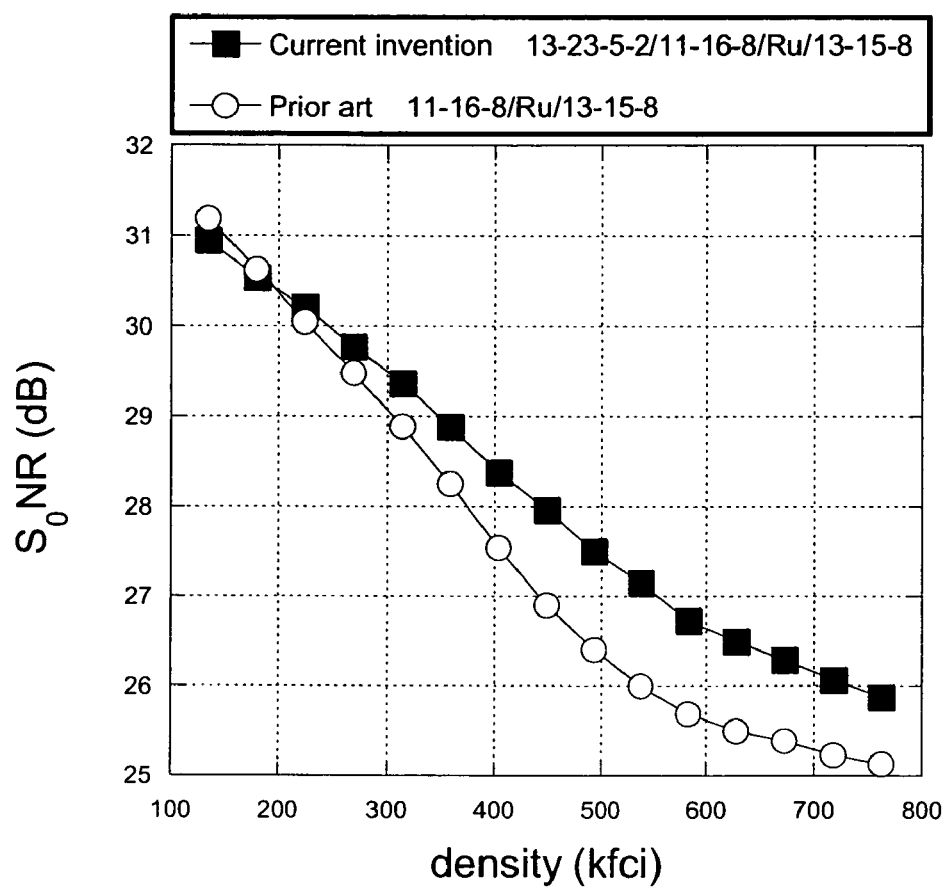
FIG. 5 shows the comparison of the S0NR of a prior art laminated media structure using a single CoPt11Cr16B8 middle layer versus the layer structure according to the invention with the lower sublayer being CoPt13Cr23B5Ta2 and the upper sublayer being CoPt11Cr16B8.

FIG. 5 shows the comparison of the S0NR of between a prior art laminated media structure using a single CoPtCrB layer with the composition CoPt11Cr16B8 as the middle layer 38 versus a laminated media structure of the current invention. The data were obtained using a structure with the lower sublayer 38B with the composition CoPt13Cr23B5Ta2 and the upper sublayer 38A with the composition CoPt11Cr16B8.

Figure 6:
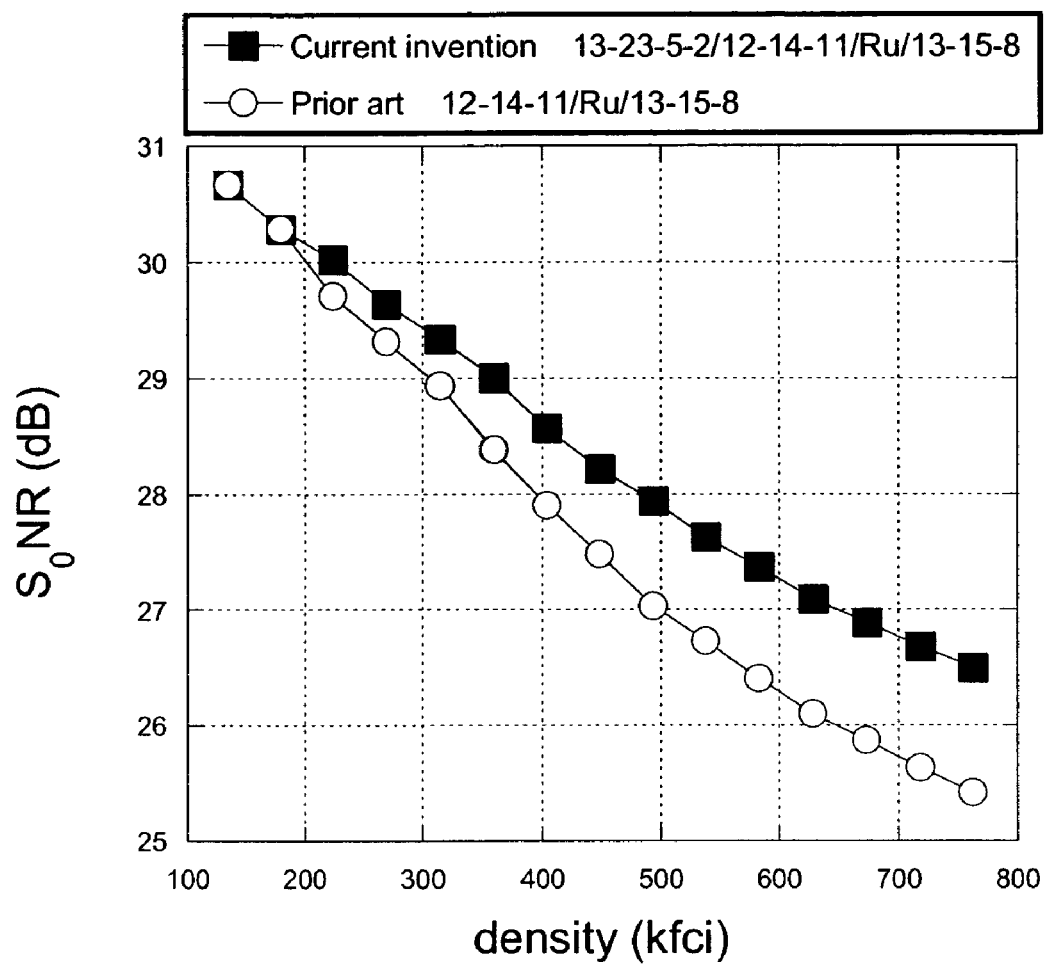
FIG. 6 is a graph showing the comparison of the S0NR of between a prior art laminated media structure using CoPt12Cr14B11 as the middle layer versus a layer structure according to the invention with the lower of sublayer being CoPt13Cr23B5Ta2 and the upper sublayer being CoPt12Cr14B11.

FIG. 6 shows the comparison of the S0NR of between a prior art laminated media structure using a single CoPtCrB layer with the composition CoPt12Cr14B11 as the middle layer versus a laminated media structure of the current invention where this single CoPtCrB layer is replaced by two sublayers according to the invention. The data were obtained from a layer structure with the lower of sublayer 38B with the composition CoPt13Cr23B5Ta2 and the upper sublayer 38A with the composition CoPt12Cr14B11. In both cases, FIGS. 5 & 6, significant improvements in S0NR are measured. The increase in S0NR obtained by using the current invention was 1.1 dB and 0.8 dB in the two cases at 750 kfci. Therefore, the use of this invention provides improvement of the S0NR of laminated media.

A second significant issue regarding laminated media is the difficultly in appropriately designing the layers for optimal writing by a magnetic recording head. This problem arises because the magnetic field produced by the recording head decreases with spacing away from the head. Since this magnetic field writes the recorded information in the magnetic layers, it is necessary that the intrinsic coercivity $H_0$ of each of the layers be adjusted to match the magnetic field. There is about 20% less field available to write the middle magnetic layer(s) in the laminated media structure than the upper layer 36. Therefore, the $H_0$ of the middle layer must be about 20% less than the $H_0$ of the upper magnetic layer for this head design.

Changes in $H_0$ can be achieved by changes in composition and changes in growth conditions. If the magnetic field produced by the head is much larger than $H_0$ of the layer (the field gradient is small) then the layer will be written poorly, producing poor performance because the head field gradient during writing will be poor. If the magnetic field produced by the head is much smaller than $H_0$ of the layer, then the layer will be written poorly producing poor performance because the head field cannot switch some of the magnetic grains. Therefore, the $H_0$ of the middle layer needs to be well matched to the field produced by the recording head.

In laminated media the $H_0$ of both the upper and middle layers need to be simultaneously matched to the head field due to the fact that they are substantially independent. This is very difficult to do because typically an alloy is chosen for the upper layer and then the growth conditions are adjusted such that it is written optimally. Next the alloy composition is changed in the middle layer such that its $H_0$ is matched to the head field, but this changes the growth which in turn changes the $H_0$ of the upper layer such that now it needs to be adjusted again. Therefore, adjusting the $H_0$ of both layers simultaneously to the head field is difficult. In the design process, experiments with different layer composition require that corresponding sputtering targets be available. Even a small change in composition requires a completely different target. Therefore, an experiment using a range of compositions requires a large number of targets with different compositions and entails significant expense. However, in the current invention, since the two sublayers that comprise the middle layer of the laminated media structure are directly exchange coupled together, the effective $H_0$ of this combined layer is given by the weighted average of the two. Therefore, the $H_0$ of this composite lower layer 38A, 38B can be readily adjusted by simply changing the thickness ratio of the two layers without the necessity of changing targets. Changing the thickness only requires that the deposition time period be altered which is simple and inexpensive. Furthermore, with the invention $H_0$ can be changed with much finer control over the value than is possible with the complete change of the alloy composition as is done in the prior art. Also, the invention allows the adjustment to be achieved with minimal effect on growth conditions and is done without needing a large amount of targets with numerous different instrument configurations (each new target tested requires a new instrument configuration, while with this invention only one configuration is used). Therefore, this invention also provides a method for better and more efficiently optimizing the intrinsic coercivity of the two layers in the laminated media structure to the head field.

The lower magnetic layer 40 is a ferromagnetic material of the type used in the prior art of thin film disks. Examples of materials suitable for the lower magnetic layer 40 include CoCr, CoPtCr, CoCrTa and CoPtCrB. The AFC spacer layer 39 is a nonmagnetic material with a thickness that is selected to antiferromagnetically couple the top magnetic layer structures above the AFC spacer with the lower magnetic layer 40. Ruthenium is the preferred material for the spacer layer 37, but the prior art indicates that suitable materials include chromium (Cr), rhodium (Rh), iridium (Ir), copper (Cu), and their alloys. The thickness of the spacer layer 37 is according to the prior art; for example, approximately 12 angstroms is a preferred target thickness for a ruthenium spacer layer 37. In laminated media according to the invention, the spacer layer 37 is selected to substantially decouple the upper and middle ferromagnetic layers.

Figure 7:
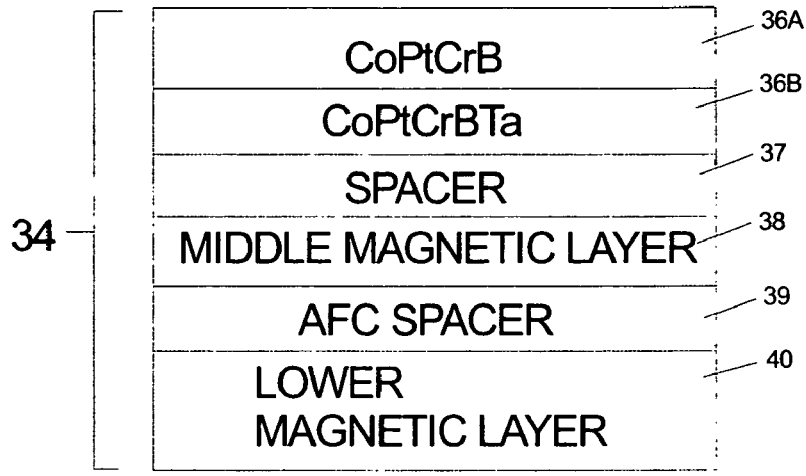
FIG. 7 is an illustration of a laminated, antiferromagnetically coupled magnetic layer stack for a magnetic thin film disk according to a second embodiment of the invention.

FIG. 7 is an illustration of a laminated, antiferromagnetically coupled magnetic layer stack for a magnetic thin film disk according to a second embodiment of the invention. In the embodiment shown the upper ferromagnetic layer has been replaced by the two sublayers 36A, 36B according to the invention. The composition and principles stated above for the sublayers also apply in this embodiment.

Figure 8:
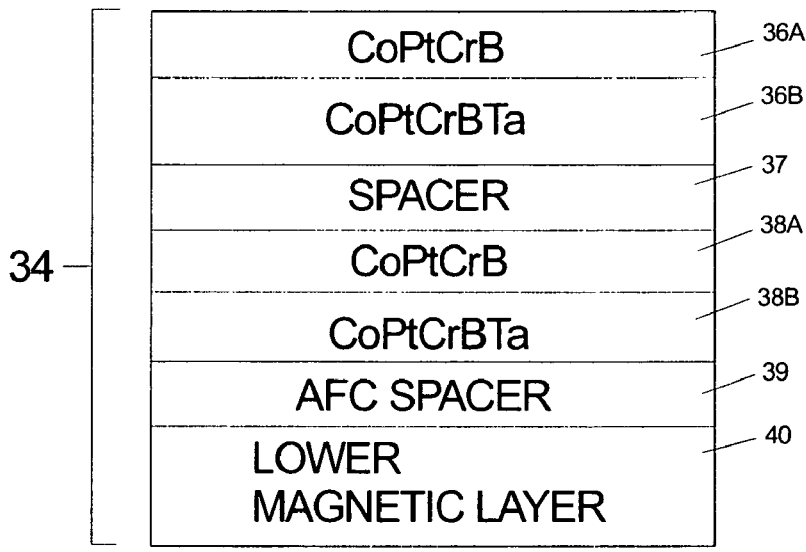
FIG. 8 is an illustration of a laminated, antiferromagnetically coupled magnetic layer stack for a magnetic thin film disk according to a third embodiment of the invention.

FIG. 8 is an illustration of a laminated, antiferromagnetically coupled magnetic layer stack for a magnetic thin film disk according to a third embodiment of the invention. In this embodiment the upper ferromagnetic layer has been replaced by the two sublayers 36A, 36B according to the invention and the middle ferromagnetic layer has been replaced by the two sublayers 38A, 38B according to the invention. The composition and principles stated above for the sublayers also apply in this embodiment.

The thin film structures described above can be formed using standard sputtering techniques. The films are sequentially sputter deposited with each film being deposited on the previous film. The atomic percent compositions given above are given without regard for the small amounts of contamination that invariably exist in sputtered thin films as is well known to those skilled in the art. The invention has been described with respect to particular embodiments, but other uses and applications for the ferromagnetic structure according to the invention will be apparent to those skilled in the art.

The invention claimed is:
1. A disk drive comprising:
a magnetic transducer including a read and a write head positionable to read and write magnetic transitions on a magnetic thin film disk; and
the magnetic thin film disk including:
first and second ferromagnetic layers separated by a spacer layer that substantially decouples the first and second magnetic layers with at least one of the first and second magnetic layers further comprising:
a first sublayer of ferromagnetic material of an alloy of CoCrPt including at least one element from the group consisting of boron and tantalum and having a composition of approximately 10-14 at. % Pt, 19-26 at. % Cr, 0-7 at. % boron, 0-3 at % Ta; and
a second sublayer of ferromagnetic material deposited on the first sublayer having a higher boron content than the first sublayer.

2. The disk drive of claim 1 wherein the second sublayer is CoPtCrB with a composition of 11-14 at. % Pt, 11-20 at % Cr, 8-16 at. % boron.

3. The disk drive of claim 1 wherein the first sublayer has a total atomic percentage of boron and tantalum combined of less than or equal to 7 atomic percent.

4. The disk drive of claim 1 wherein the first sublayer has a total atomic percentage of tantalum of less than or equal to 3 atomic percent.

5. The disk drive of claim 1 wherein the first or second layer of ferromagnetic material includes CoPtCrB.

6. The disk drive of claim 1 wherein the second sublayer is Co63Pt12Cr14B11.

7. The disk drive of claim 1 wherein the first sublayer is Co57Pt13Cr23B5Ta2.

* * * * *